US012776871B2

(12) United States Patent
Liu et al.

(10) Patent No.: US 12,776,871 B2
(45) Date of Patent: Oct. 27, 2026

(54) METHOD AND APPARATUS FOR SPATIAL FILTER SIGNALING DURING WIRELESS COMMUNICATION

(71) Applicant: LENOVO (BEIJING) LIMITED, Beijing (CN)

(72) Inventors: Hongmei Liu, Beijing (CN); Zhi Yan, Beijing (CN); Yuantao Zhang, Beijing (CN); Haiming Wang, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 258 days.

(21) Appl. No.: 18/714,376

(22) PCT Filed: Nov. 30, 2021

(86) PCT No.: PCT/CN2021/134514
§ 371 (c)(1),
(2) Date: May 29, 2024

(87) PCT Pub. No.: WO2023/097482
PCT Pub. Date: Jun. 8, 2023

(65) Prior Publication Data
US 2025/0023676 A1 Jan. 16, 2025

(51) Int. Cl.
*H04L 5/00* (2006.01)
*H04B 7/06* (2006.01)
*H04W 72/044* (2023.01)

(52) U.S. Cl.
CPC ....... *H04L 5/0023* (2013.01); *H04B 7/06968* (2023.05); *H04W 72/046* (2013.01)

(58) Field of Classification Search
None
See application file for complete search history.

(56) References Cited

U.S. PATENT DOCUMENTS

2021/0105751 A1* 4/2021 Xu ........................ H04W 72/23
2021/0314953 A1 10/2021 Park
(Continued)

FOREIGN PATENT DOCUMENTS

CN 113273301 A 8/2021
WO 2021168144 A1 8/2021

OTHER PUBLICATIONS

NTT Docomo, Inc. "[draft] CR on default PDCCH/PUCCH beam during transition period" 3GPP TSG RAN WG1 Meeting #95 R1-1813299; Nov. 16, 2018; 5 pages.
(Continued)

*Primary Examiner* — Edemio Navas, Jr.
(74) *Attorney, Agent, or Firm* — AMPACC Law Group, PLLC

(57) ABSTRACT

Embodiments of the present application are related to a method and apparatus for data transmission during wireless communication. According an embodiment of the present application, an exemplary method includes: receiving a first signaling indicating whether a first spatial domain filter associated with a first set of reference signal (RS) is on or off, wherein the first set of RS is associated with at least one of: downlink reception or uplink transmission; and in the case that the first signaling indicates the first spatial domain filer being off, stopping performing the associated at least one of: downlink reception or uplink transmission, or performing the associated at least one of: downlink reception or uplink transmission with a second spatial domain filter different from the first domain filter.

18 Claims, 6 Drawing Sheets

(56) References Cited

U.S. PATENT DOCUMENTS

| | | | | |
|---|---|---|---|---|
| 2022/0070704 | A1* | 3/2022 | Khoshnevisan | H04L 5/0023 |
| 2024/0008038 | A1* | 1/2024 | Li | H04L 1/1812 |

OTHER PUBLICATIONS

International Search Report and Written Opinion dated Aug. 18, 2022 for International Application No. PCT/CN2021/134514.

* cited by examiner

METHOD AND APPARATUS FOR SPATIAL FILTER SIGNALING DURING WIRELESS COMMUNICATION

CROSS REFERENCE TO RELATED APPLICATIONS

This application is a national phase entry of International Application No. PCT/CN2021/134514, filed on Nov. 30, 2021, which is incorporated by reference in its entirety.

TECHNICAL FIELD

Embodiments of the present application generally relate to wireless communication technologies, especially to a method and apparatus for data transmission during wireless communication.

BACKGROUND

Wireless communication systems are widely deployed to provide various telecommunication services such as telephony, video, data, messaging, broadcasts, and so on. Wireless communication systems may employ multiple access technologies capable of supporting communication with multiple users by sharing available system resources (e.g., time, frequency, and power). Examples of wireless communication systems may include fourth generation (4G) systems such as long term evolution (LTE) systems, LTE-advanced (LTE-A) systems, or LTE-A Pro systems, and fifth generation (5G) systems which may also be referred to as new radio (NR) systems.

To improve network energy savings in terms of both base station (BS) transmission and reception, techniques are studied and identified on the BS side and user equipment (UE) side. For example, according to RP-212669, the focus areas include how to achieve more efficient dynamic and/or semi-static and finer granularity adaptation of transmissions and/or receptions in one or more of time, frequency, spatial, and power domains, with potential support/feedback from UE. Additional areas of the study may include UE assistance information and intra-network information exchange/coordination. In addition, RP-212669 also provides that legacy UEs should be able to continue accessing a network implementing Rel-18 network energy savings techniques, with the possible exception of techniques developed specifically for greenfield deployments.

Thus, it is desirable to improve technical solutions for data transmission, especially considering saving energy in BS side and UE side as required to adapt the industry trend.

SUMMARY OF THE DISCLOSURE

One objective of the present application is to provide a method and apparatus for data transmission during wireless transmission, which can at least save energy in the BS side and UE side.

According to an embodiment of the present application, a remote apparatus includes: at least one receiving circuitry; at least one transmitting circuitry; and at least one processor coupled to the at least one receiving circuitry and the at least one transmitting circuitry, wherein the at least one processor is configured to: receive a first signaling indicating whether a first spatial domain filter associated with a first set of reference signal (RS) is on or off, wherein the first set of RS is associated with at least one of: downlink reception or uplink transmission in the remote apparatus; and in the case that the first signaling indicates that the first spatial domain filter is off, stop performing the associated at least one of: downlink reception or uplink transmission, or perform the associated at least one of: downlink reception or uplink transmission associated with a second spatial domain filter different from the first spatial domain filter.

In some embodiments of the present application, in the case that the first signaling indicates the first spatial domain filter is on, the at least one processor is configured to: perform the associated at least one of: downlink reception or uplink transmission with the first spatial domain filter.

In some embodiments of the present application, the first signaling is media access control (MAC) control element (CE), scheduling downlink control information (DCI), or group common DCI.

In some embodiments of the present application, the first signaling is associated with a time domain duration beginning from a time instance. According to some embodiments of the present application, the time instance is determined based on a configured or predefined time domain delay between reception of the first signaling and application of the first signaling. In the case that the first signaling is group common DCI, the time instance is determined as a slot boundary associated with the group common DCI based on a predefined rule. The time domain duration is configured by radio resource control (RRC) or MAC CE. According to some embodiments of the present application, the time domain duration is in a unit of millisecond or in a unit of slot, and in the case that the unit is slot, a length of the slot is determined by configured subcarrier spacing (SCS) or by SCS determined based on frequency band. According to some embodiments of the present application, the time domain duration is divided into a plurality of sub-durations, and different sub-durations are associated with different RSs whose associated spatial domain filter are set on or set off.

In some embodiments of the present application, the first signaling indicates whether the first spatial domain filter associated with the first set of RS is on or off by a bitmap corresponding to each RS of the first set of RS.

In some embodiments of the present application, the first signaling indicates whether the first spatial domain filter associated with the first set of RS is on or off by codepoints, each codepoint indicating a group containing at least one RS associated a spatial domain filter being on or a group containing at least one RS associated a spatial domain filter being off. Within each group the at least one RS is on or off is predefined or configured by a higher layer signaling.

In some embodiments of the present application, for a time instance, in the case that besides the first signaling, at least one other signaling indicates the first spatial domain filter is on or off, the at least one other signaling is consistent with the first signaling, or a latest one of the first signaling and the at least one other signaling has a higher priority.

In some embodiments of the present application, in the case that the first signaling indicates that the first spatial domain filter is off, not performing the associated at least one of: downlink reception or uplink transmission further includes: stopping monitoring physical downlink control channel (PDCCH) in the case that at least one RS with quasi co-location (QCL)-typeD for a control resource set (CORESET) where a search space of the PDCCH is contained belongs to the first set of RS. The at least one processor is configured to: in response to the RS with QCL-typeD of the CORESET is updated by a MAC CE, stop or continue monitoring the PDCCH based on the spatial domain configuration in the MAC CE.

In some embodiments of the present application, in the case that the first signaling indicates that the first spatial domain filter is off, not performing the associated at least one of: downlink reception or uplink transmission further includes: stopping receiving semi-persistent scheduling (SPS) physical downlink shared channel (PDSCH) and deactivating the SPS PDSCH or not, in the case that at least one RS with QCL-typeD of a transmission configuration indication (TCI) state of the PDSCH belongs to the first set of RS.

In some embodiments of the present application, in the case that the first signaling indicates that the first spatial domain filter is off, not performing the associated at least one of: downlink reception or uplink transmission further includes: in the case that there are a plurality of PDSCH occasions scheduled by a PDCCH and two TCI states in a codepoint of a DCI field, and each PDSCH occasion is associated with a TCI state, stopping receiving at least one PDSCH occasion of the plurality of PDSCH occasions, wherein the at least one RS with QCL-typeD in the corresponding TCI state associated with the at least one PDSCH occasion belongs to the first set of RS. According to some embodiments of the present application, acknowledge (ACK)/negative ACK (NACK) for the PDSCH is generated based on remaining PDSCH occasions of the plurality of PDSCH occasions that are not stopped. The two TCI states are associated with different demodulation reference signal (DMRS) code division multiplexing (CDM) groups, each DMRS CDM group is associated with a PDSCH codeword and a PDSCH occasion; and for feedback generation of PDSCH codewords associated with stopped PDSCH occasions, NACK is generated or ACK/NACK is generated based on the remaining PDSCH occasions.

In some embodiments of the present application, in the case that the first signaling indicates that the first set of RS is off, performing the associated at least one of: downlink reception or uplink transmission with the second spatial domain filter further includes: in the case that there are a plurality of PDSCH occasions scheduled by a PDCCH and two TCI states in a codepoint of a DCI field, receiving at least one PDSCH occasion of the plurality of PDSCH occasions with the second spatial domain filter, wherein at least one RS with QCL-typeD in the corresponding TCI state associated with the at least one PDSCH occasion belongs to the first set of RS.

In some embodiments of the present application, in the case that the first signaling indicates that the first spatial domain filter is off, not performing the associated at least one of: downlink reception or uplink transmission or performing the associated at least one of: downlink reception or uplink transmission with the second spatial domain filter further includes: in the case that an SRS indicated by an SRI of a scheduling DCI or RRC configuration belongs to the first Set of RS, stopping transmitting a codebook based physical uplink shared channel (PUSCH), or transmitting the codebook based PUSCH with the second spatial domain filter.

In some embodiments of the present application, in the case that the first signaling indicates that the first spatial domain filter is off, not performing the associated at least one of: downlink reception or uplink transmission or performing the associated at least one of: downlink reception or uplink transmission with the second spatial domain filter further includes: in the case that a spatial domain transmission layer of a codeword of a non-codebook based PUSCH is associated with an SRS resource indicated by an SRI in the scheduling DCI or RRC configuration, and the at least one SRS belongs to the first set of RS, stopping transmitting the codeword, or transmitting the codeword with the second spatial domain filter.

In some embodiments of the present application, in the case that the first signaling indicates that the first spatial domain filter is off, not performing the associated at least one of: downlink reception or uplink transmission or performing the associated at least one of: downlink reception or uplink transmission with the second spatial domain filter further includes: in the case that a RS associated with a spatial domain filter of a PUSCH scheduled by DCI 0-0 belongs to the first set of RS, stopping transmitting the PUSCH, or transmitting the PUSCH with the second spatial domain filter.

In some embodiments of the present application, in the case that the first signaling indicates that the first spatial domain filter is off, not performing the associated at least one of: downlink reception or uplink transmission or performing the associated at least one of: downlink reception or uplink transmission with the second spatial domain filter further includes: in the case that a RS associated with a spatial domain filter of a PUCCH belongs to the first Set of RS, stopping transmitting the PUCCH, or transmitting the PUCCH with the second spatial domain filter.

In some embodiments of the present application, the second spatial domain filter is determined based on a lowest indexed TCI state of a PUSCH TCI state list excluding the TCI state whose associated spatial domain filter is indicated off.

In some embodiments of the present application, the second spatial domain filter is determined based on a lowest indexed downlink RS excluding that whose associated spatial domain filter indicated off, or a lowest indexed uplink RS excluding that whose associated spatial domain filter is indicated off, or a lowest indexed RS excluding that whose associated spatial domain filter indicated off.

In some embodiments of the present application, the second spatial domain filter is determined based on a TCI state of a lowest indexed CORESET excluding a CORESET whose associated QCL-typeD RS belongs to the first set of RS associated with the first spatial domain filter indicated off.

In some embodiments of the present application, the second spatial domain filter is determined based on a lowest indexed PUCCH resource in a PUCCH resource set excluding a PUCCH resource whose spatial relation information is associated with a RS belongs to the first set of RS associated with the first spatial domain filter indicated off.

In some embodiments of the present application, the second spatial domain filter is determined based on a lowest indexed one of a set of pathloss RSs excluding a path loss RS belongs to the first set of RS associated with the first spatial domain filter indicated off.

In some embodiments of the present application, in the case that the first signaling indicates that the first spatial domain filter is off, not performing the associated at least one of: downlink reception or uplink transmission further includes: stopping transmitting an SRS resource in the case that a RS associated with spatial relation information of the SRS resource belongs to the first set of RS whose associated spatial domain filter is indicated off. The at least one processor is configured to: in response to spatial relation information of the SRS is updated by a MAC CE different from the first signaling, stop transmitting the SRS or not based on spatial relation information in the MAC CE.

In some embodiments of the present application, the at least one processor is configured to: transmit a PUCCH or not based on a synchronization signal block (SSB) associated with the first spatial domain filter indicated on by the first signaling.

In some embodiments of the present application, in the case that the first signaling indicates the first spatial domain filter is off, the at least one processor is configured to: stop performing the associated at least one of: downlink reception or uplink transmission and deactivate the corresponding downlink reception or uplink transmission.

According to some other embodiments of the present application, a network apparatus includes: at least one receiving circuitry; at least one transmitting circuitry; and at least one processor coupled to the at least one receiving circuitry and the at least one transmitting circuitry, wherein the at least one processor is configured to: transmit a first signaling indicating whether a first spatial domain filter associated with a first set of RS is on or off, wherein the first set of RS is associated with at least one of: downlink transmission or uplink reception in the network apparatus; and in the case that the first signaling indicates that the first spatial domain filter is off, stop performing the associated at least one of: downlink transmission or uplink reception, or perform the associated at least one of: downlink transmission or uplink reception with a second spatial domain filter different from the first spatial domain filter.

In some embodiments of the present application, in the case that the first signaling indicates the first spatial domain filter is on, the at least one processor is configured to: perform the associated at least one of: downlink transmission or uplink reception with the first spatial domain filter.

In some embodiments of the present application, in the case that the first signaling indicates that the first spatial domain filter is off, not performing the associated at least one of: downlink transmission or uplink reception further includes: stopping transmitting PDCCH in the case that at least one RS with QCL-typeD for a CORESET where a search space of the PDCCH is contained belongs to the first set of RS. The at least one processor is configured to: in response to the RS with QCL-typeD of the CORESET is updated by a MAC CE, stop or continue transmitting the PDCCH based on the spatial domain configuration in the MAC CE.

In some embodiments of the present application, in the case that the first signaling indicates that the first spatial domain filter is off, not performing the associated at least one of: downlink transmission or uplink reception further includes: stopping transmitting SPS PDSCH and the SPS PDSCH is still activated, in the case that at least one RS with QCL-typeD of a TCI state of the PDSCH belongs to the first set of RS.

In some embodiments of the present application, in the case that the first signaling indicates that the first spatial domain filter is off, not performing the associated at least one of: downlink transmission or uplink reception further includes: stopping transmitting SPS PDSCH and the SPS PDSCH is deactivated, in the case that at least one RS with QCL-typeD of a TCI state of the PDSCH belongs to the first set of RS.

In some embodiments of the present application, in the case that the first signaling indicates that the first spatial domain filter is off, not performing the associated at least one of: downlink transmission or uplink reception further includes: in the case that there are a plurality of PDSCH occasions scheduled by a PDCCH and two TCI states in a codepoint of a DCI field, and each PDSCH occasion is associated with a TCI state, stopping transmitting at least one PDSCH occasion of the plurality of PDSCH occasions, wherein the at least one RS with QCL-typeD in the corresponding TCI state associated with the at least one PDSCH occasion belongs to the first set of RS.

In some embodiments of the present application, in the case that the first signaling indicates that the first set of RS is off, performing the associated at least one of: downlink transmission or uplink reception with the second spatial domain filter further includes: in the case that there are a plurality of PDSCH occasions scheduled by a PDCCH and two TCI states in a codepoint of a DCI field, transmitting at least one PDSCH occasion of the plurality of PDSCH occasions with the second spatial domain filter, wherein at least one RS with QCL-typeD in the corresponding TCI state associated with the at least one PDSCH occasion belongs to the first set of RS.

In some embodiments of the present application, in the case that the first signaling indicates that the first spatial domain filter is off, not performing the associated at least one of: downlink transmission or uplink reception or performing the associated at least one of: downlink transmission or uplink reception with the second spatial domain filter further includes: in the case that an SRS indicated by an SRI of a scheduling DCI or RRC configuration belongs to the first set of RS, stopping receiving a codebook based PUSCH, or receiving the codebook based PUSCH with the second spatial domain filter.

In some embodiments of the present application, in the case that the first signaling indicates that the first spatial domain filter is off, not performing the associated at least one of: downlink transmission or uplink reception or performing the associated at least one of: downlink transmission or uplink reception with the second spatial domain filter further includes: in the case that a spatial domain transmission layer of a codeword of a non-codebook based PUSCH is associated with an SRS resource indicated by an SRI in the scheduling DCI or RRC configuration, and the at least one SRS belongs to the first Set of RS, stopping receiving the codeword, or receiving the codeword with the second spatial domain filter.

In some embodiments of the present application, in the case that the first signaling indicates that the first spatial domain filter is off, not performing the associated at least one of: downlink transmission or uplink reception or performing the associated at least one of: downlink transmission or uplink reception with the second spatial domain filter further includes: in the case that a RS associated with a spatial domain filter of a PUSCH scheduled by DCI 0-0 belongs to the first set of RS, stopping receiving the PUSCH, or receiving the PUSCH with the second spatial domain filter.

In some embodiments of the present application, in the case that the first signaling indicates that the first spatial domain filter is off, not performing the associated at least one of: downlink transmission or uplink reception or performing the associated at least one of: downlink transmission or uplink reception with the second spatial domain filter further includes: in the case that a RS associated with a spatial domain filter of a PUCCH belongs to the first Set of RS, stopping monitoring the PUCCH, or monitoring the PUCCH with the second spatial domain filter.

In some embodiments of the present application, in the case that the first signaling indicates that the first spatial domain filter is off, not performing the associated at least one of: downlink transmission or uplink reception further includes: stopping receiving an SRS resource in the case that a RS associated with spatial relation information of the SRS resource belongs to the first set of RS whose associated spatial domain filter is indicated off. The at least one processor is configured to: in response to spatial relation information of the SRS is updated by a MAC CE different from the first signaling, stop receiving the SRS or not based on spatial relation information in the MAC CE.

In some embodiments of the present application, the at least one processor is configured to: monitor a PUCCH or not based on an SSB associated with the first spatial domain filter indicated on by the first signaling.

According to some yet other embodiments of the present application, a method for wireless communication includes: receiving a first signaling indicating whether a first spatial domain filter associated with a first set of RS is on or off, wherein the first set of RS is associated with at least one of: downlink reception or uplink transmission; and in the case that the first signaling indicates the first spatial domain filer being off, stopping performing the associated at least one of: downlink reception or uplink transmission, or performing the associated at least one of: downlink reception or uplink transmission with a second spatial domain filter different from the first domain filter.

Embodiments of the present application provide a technical solution supporting dynamic beam on/off indication to save network energy, obviate the impact on data transmission, e.g., PDCCH, PDSCH, PUCCH, PUSCH and SRS etc. caused by the dynamic beam on/off indication, and thus will facilitate the deployment and implementation of the NR.

BRIEF DESCRIPTION OF THE DRAWINGS

In order to describe the manner in which the advantages and features of the disclosure can be obtained, a description of the disclosure is rendered by reference to specific embodiments thereof, which are illustrated in the appended drawings. These drawings depict only exemplary embodiments of the disclosure and are not therefore to be considered limiting of its scope.

Figure 5A:
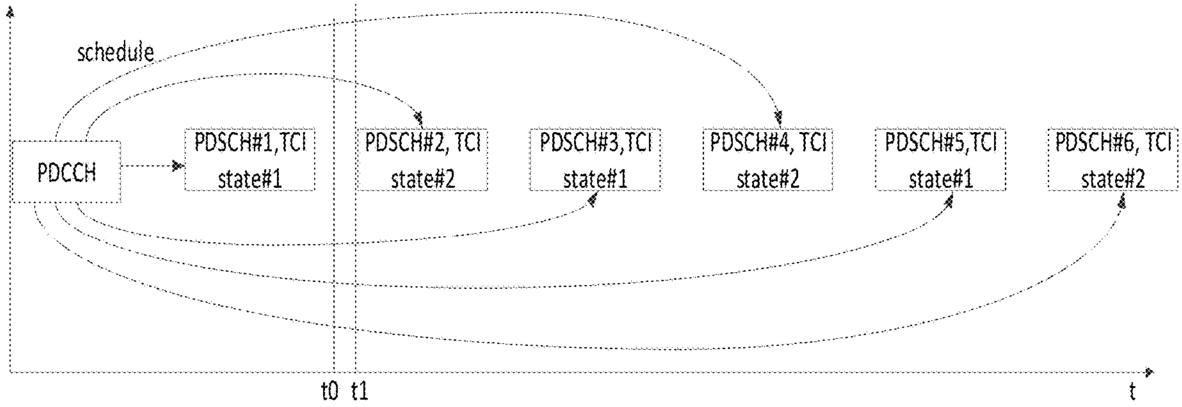
Figure 5B:
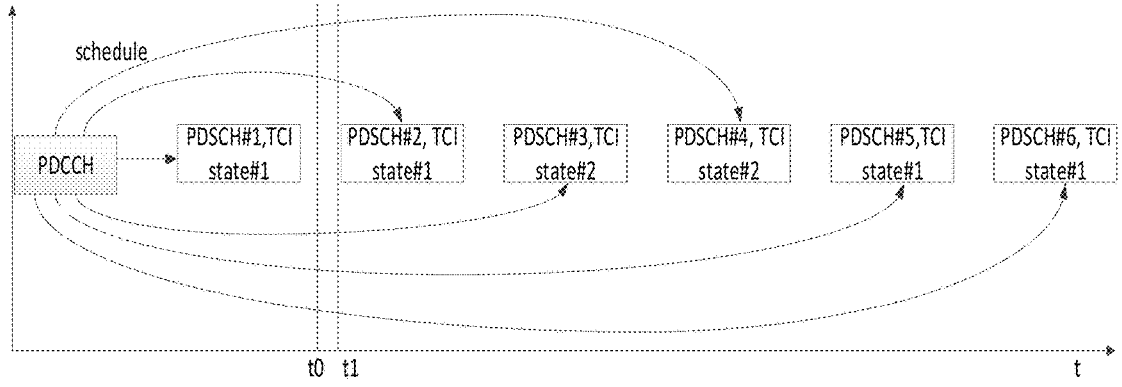

Both of FIGS. 5*a* and 5*b* illustrate a diagram of an exemplary TDMed PDSCH transmission under the dynamic beam on/off indication mechanism according to some embodiments of the present application.

Figure 6:
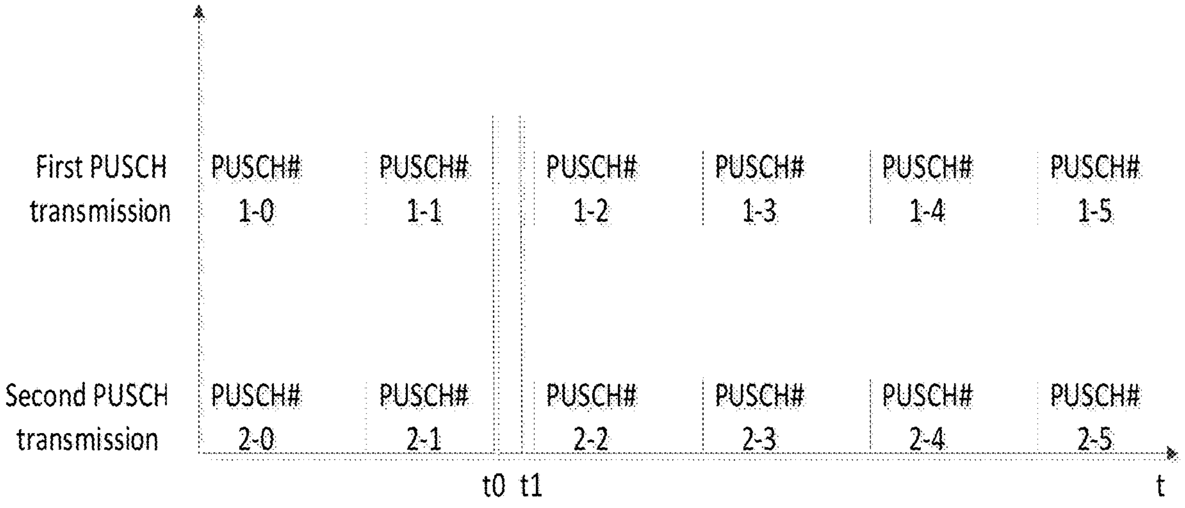

FIG. 6 illustrates a diagram of an exemplary PUSCH transmission under the dynamic beam on/off indication mechanism according to some embodiments of the present application.

Figure 7:
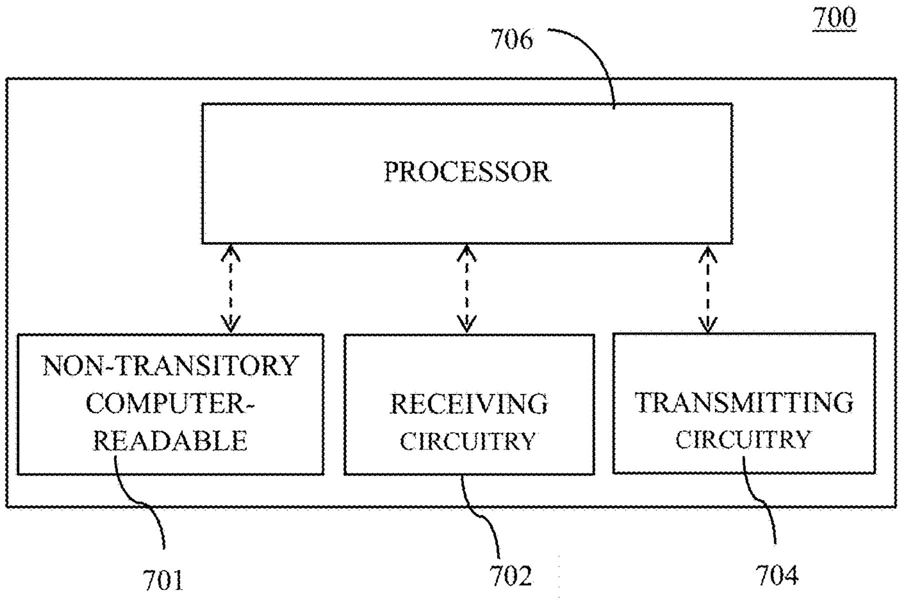

FIG. 7 illustrates a block diagram of an exemplary apparatus according to some embodiments of the present application.

Figure 8:
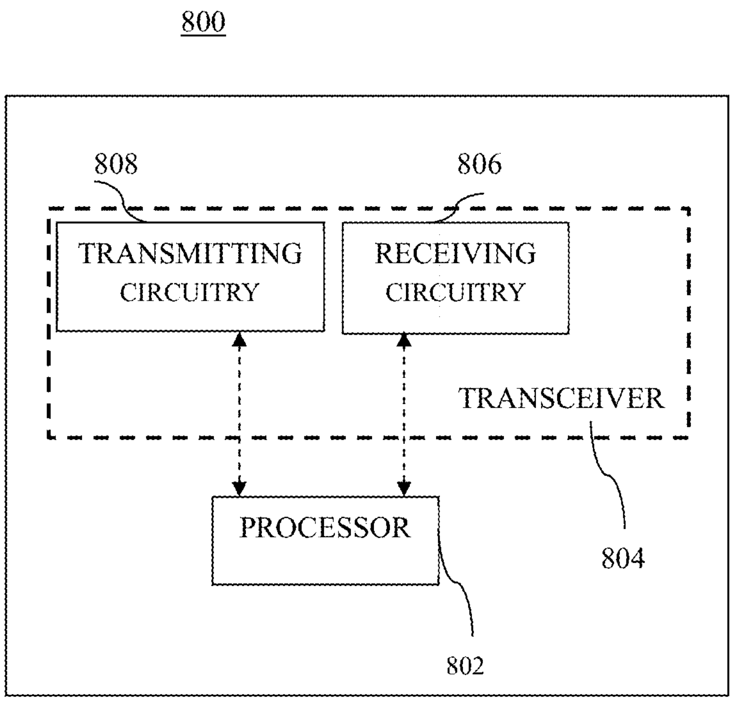

FIG. 8 illustrates a block diagram of an exemplary apparatus according to some other embodiments of the present application.

DETAILED DESCRIPTION

The detailed description of the appended drawings is intended as a description of the preferred embodiments of the present application and is not intended to represent the only form in which the present application may be practiced. It should be understood that the same or equivalent functions may be accomplished by different embodiments that are intended to be encompassed within the spirit and scope of the present application.

Reference will now be made in detail to some embodiments of the present application, examples of which are illustrated in the accompanying drawings. To facilitate understanding, embodiments are provided under specific network architecture and new service scenarios, such as 3rd generation partnership project (3GPP) 5G, 3GPP LTE, and so on. It is contemplated that along with the developments of network architectures and new service scenarios, all embodiments in the present application are also applicable to similar technical problems; and moreover, the terminologies recited in the present application may change, which should not affect the principle of the present application.

Figure 1:
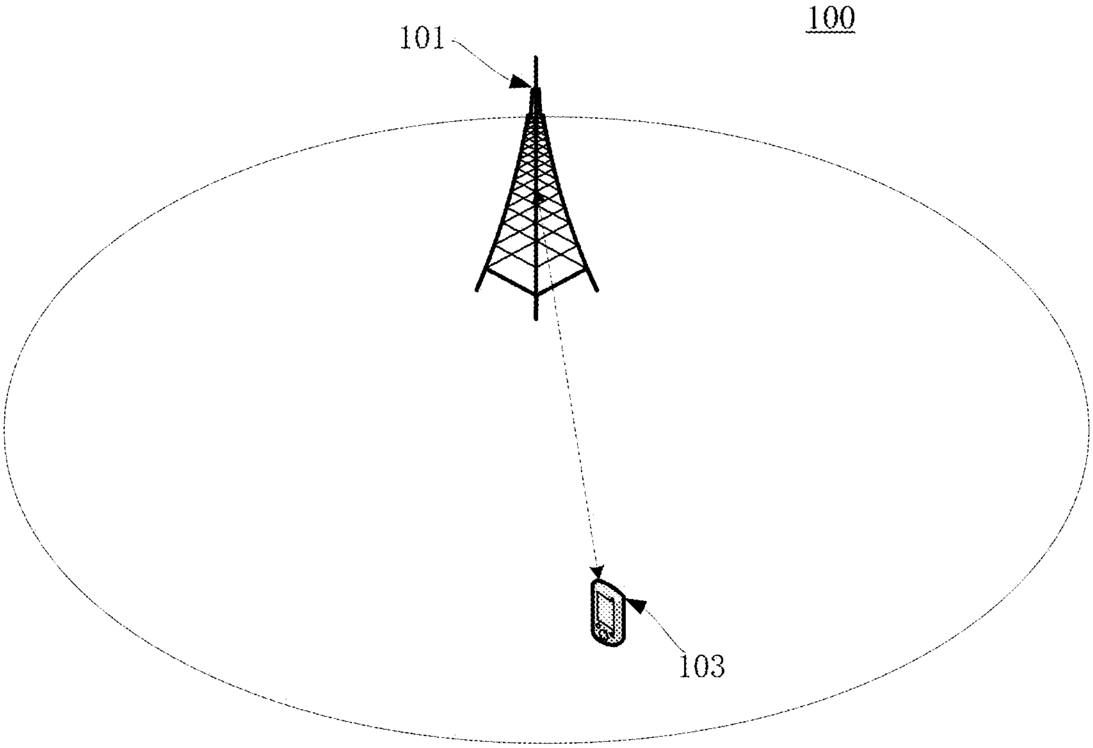
FIG. 1 is a schematic diagram illustrating an exemplary wireless communication system according to some embodiments of the present application.

FIG. 1 illustrates a schematic diagram of an exemplary wireless communication system 100 according to some embodiments of the present application.

As shown in FIG. 1, the wireless communication system 100 includes a UE 103 and a BS 101. Although merely one BS is illustrated in FIG. 1 for simplicity, it is contemplated that the wireless communication system 100 may include more BSs in some other embodiments of the present application. Similarly, although merely one UE is illustrated in FIG. 1 for simplicity, it is contemplated that the wireless communication system 100 may include more UEs in some other embodiments of the present application.

The wireless communication system 100 is compatible with any type of network that is capable of sending and receiving wireless communication signals. For example, the wireless communication system 100 is compatible with a wireless communication network, a cellular telephone network, a time division multiple access (TDMA)-based network, a code division multiple access (CDMA)-based network, an orthogonal frequency division multiple access (OFDMA)-based network, an LTE network, a 3GPP-based network, a 3GPP 5G network, a satellite communications network, a high altitude platform network, and/or other communications networks.

The BS 101 may also be referred to as an access point, an access terminal, a base, a macro cell, a node-B, an enhanced node B (eNB), a gNB, a home node-B, a relay node, or a device, or described using other terminology used in the art. The BS 101 is generally part of a radio access network that may include a controller communicably coupled to the BS 101.

The UE 103 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. According to an embodiment of the present application, the UE 103 may include a portable wireless communication device, a smart phone, a cellular telephone, a flip phone, a device having a subscriber identity module, a personal computer, a selective call receiver, or any other device that is capable of sending and receiving communication signals on a wireless network. In some embodiments, the UE 103 may include wearable devices, such as smart watches, fitness bands, optical head-mounted displays, or the like. Moreover, the UE 103 may be referred to as a subscriber unit, a mobile, a mobile station, a user, a terminal, a mobile terminal, a wireless terminal, a fixed terminal, a subscriber station, a user terminal, or a device, or described using other terminology used in the art.

The BS 101 may transmit resource configuration information to the UE 103.

A RS may be a channel state information-reference signal (CSI-RS), an SSB, or an SRS etc., various RSs. In addition, a RS may be associated with a time domain filter, a frequency domain filter, or a spatial domain filter. Each beam (may be represented by spatial relation information) of a BS or UE is associated with a spatial domain transmission or reception filter, which is associated with at least one RS. That is, each beam is also associated with at least one RS. From the perspective of the remote side, a downlink (DL) beam may be associated with a spatial domain reception filter, and an uplink (UL) beam may be associated with a spatial domain transmission filter. From the perspective of the network side, a DL beam may be associated with a spatial domain transmission filter, and a UL beam may be associated with a spatial domain reception filter. Thus, a beam being on or off can also be represented by a spatial domain filter being on or off.

In legacy technologies, e.g., NR R15 and R16, beam on/off is semi-statically indicated to the remote side (e.g., the UE side). For example, SSB indication is transmitted in SIB1 or RRC signaling. However, such a beam indication mechanism cannot well meet the energy saving requirement, which is an important item being studied and identified by 3GPP, specifically for greenfield deployments in the future.

At least to save energy in BS side and UE side, embodiments of the present application provide a technical solution for data transmission during wireless communication by dynamically indicating beam on or off (hereafter, referring to as "dynamic beam on/off indication mechanism" or "dynamic beam on/off indication"). Embodiments of the present application also consider the impact on the data transmission caused by the dynamic beam on/off indication mechanism, so that the dynamic beam on/off indication mechanism will be well applied in the wireless communication. Herein, data transmission should be understood by persons skilled in the art in broad sense, which includes DL transmission (transmitting from the BS side and receiving in the UE side) and UL transmission (transmitting from the UE side and receiving in the BS side) on data channel and control channel, and RS transmission (transmitting from one of the UE side and BS side, and receiving in the other side) etc. For example, a data transmission may be PDCCH, PDSCH, PUCCH, PUSCH, CSI-RS, SSB, PRACH and SRS etc.

Figure 2:
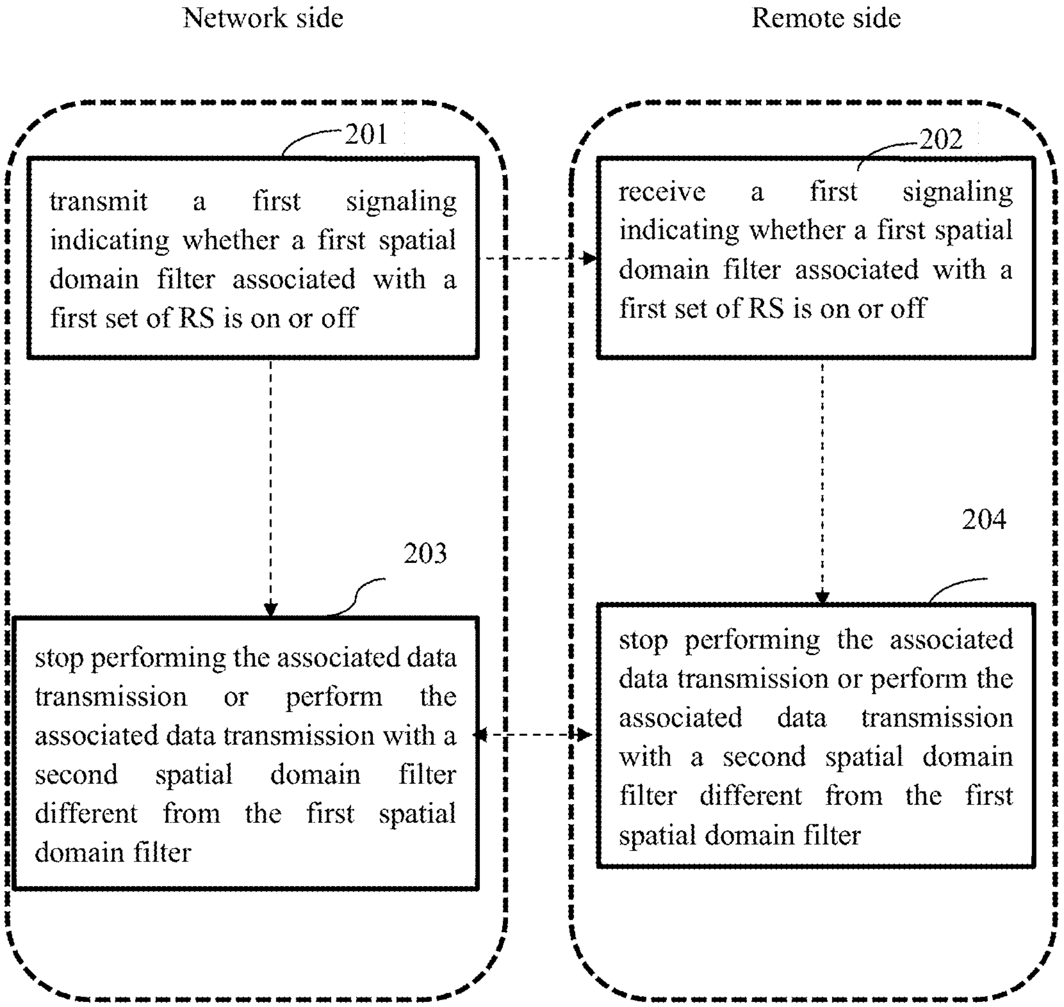
FIG. 2 is a flow chart illustrating an exemplary method for data transmission during wireless communication according to an embodiment of the present application.

FIG. 2 is a flow chart illustrating an exemplary method for data transmission during wireless communication according to an embodiment of the present application. Although the method is illustrated in a system level by a remote apparatus in the remote side (e.g., the UE 103 as illustrated and shown in FIG. 1) and a network apparatus in the network side (e.g., the BS 101 as illustrated and shown in FIG. 1), persons skilled in the art should understand that the method implemented in the remote side and that implemented in the network side can be separately implemented and/or incorporated by other apparatus with the like functions.

According to embodiments of the present application, the network side, e.g., a gNB may dynamically indicate the remote side one or more beams on or off, which can at least save network energy. For example, as shown in FIG. 2, in step 201, the network side, e.g., a gNB may transmit a first signaling to the remote side, e.g., a UE indicating whether a first spatial domain filter associated with a first set of RS is on or off. Herein, wording like "first" is only used for clear expression, and should not be deemed as the sequence limitation, and the wording "set of" or the like means "one or more" or "at least one." The first signaling may also be referring to as "a beam on/off indication signaling," or "a beam status indication signaling" etc. Consistently, in step 202, the first signaling will be received in the remote side (not considering data loss etc., factors). Persons skilled in the art should well know, the first signaling for beam on/off indication may indicate more than one spatial domain filter, e.g., indicating the first domain filter being off, indicating the second domain filter being on etc. The first spatial domain filter being illustrated is only for simplification and clearness, and should not be deemed as the limitation. Besides the first spatial domain filter, the first signaling may also indicate other spatial domain filter, and the same or the like solution can be applied to other spatial domain filter indicated by the first signaling.

From the perspective of the remote side (e.g., a remote apparatus), the first set of RS is associated with at least one of: downlink reception or uplink transmission in the remote apparatus. That is, the first set of RS is associated with the downlink reception in the remote apparatus, associated with the uplink transmission in the remote apparatus, or associated with both the downlink reception and uplink transmission in the remote apparatus. On the other hand, from the perspective of the network side (e.g., a network apparatus), the first set of RS is associated with at least one of: downlink transmission or uplink reception in the network apparatus. That is, the first set of RS is associated with the downlink transmission in the network apparatus, associated with the uplink reception in the network apparatus, or associated with both the downlink transmission and uplink reception in the network apparatus. The RS may be SSB, CSI-RS or SRS etc. The first signaling may indicate the first set of RS by indicting the index of each RS. For example, an exemplary signaling may indicate SSB #1, SSB #3 and SRS resource #2 associated with a beam indicated being on.

The first signaling can be various signaling. For example, in some embodiments of the present application, the first signaling is MAC CE, scheduling DCI, or group common DCI. In some other embodiments of the present application, the first signaling may be a UE specific DCI.

The first signaling is associated with a time domain duration beginning from a time instance, which indicates when the UE will start to perform data transmission (as stated above, the data transmission should be understood in broad sense, such as including control transmission, or RS transmission etc., hereafter the same) based on the first signaling and how long the first signaling is supposed to be applicable for the UE. The time instance can be determined based on a predefined rule or is configured by a higher layer (e.g., layer higher than physical layer) signaling, e.g., RRC signaling or MAC CE. The time instance is determined based on a configured or predefined time domain delay between reception of the first signaling and application of the first signaling in the remote apparatus. In some other embodiments of the present application, in the case of the first signaling being group common DCI, the time instance may be determined as a slot boundary associated with the group common DCI based on a predefined rule, e.g., the starting boundary or the ending boundary of the group common DCI transmission slot or the group common DCI reception slot in the UE side. Regarding the time domain duration, it is configured by RRC or MAC CE etc., higher layer signaling. The time domain duration is in a unit of millisecond, or in a unit of slot or other units. In the case that the unit is slot, a length of the slot is determined by configured SCS, or by SCS determined implicitly. For example, the SCS can be based on frequency band. In an alternative example, the SCS can be the same as the group common DCI carrying the first signaling. In another alternative example, the SCS can be the same as the SCS associated with other group common DCI, e.g., DCI 2-0, or DCI 2-5.

According to some embodiments of the present application, the time domain duration is further divided into a plurality of sub-durations, and different sub-durations are associated with different RSs whose associated spatial domain filter being set on or set off. In other words, different sub-durations are associated with different spatial domain filters being set on. For example, the signaling indicates beam on/off for 100 ms by indicating a pattern, and the 100 ms are divided into 10 sub-durations, each with 10 ms. Specifically, 0-9 ms is associated with beam status (i.e., on or off) indication #0, 10-19 ms is associated with beam status indication #1, . . . 90-99 ms is associated with beam status indication #9. Moreover, according to the signaling, for beam status #0, the beams associated with SSB #1, SSB #3 and SRS resource #2 is on; for beams status #1, the beams associated with CSI-RS resource #2 and CSI-RS resource index #5 is on; . . . and for beam status #9, the beam associated with SSB #2, CSI-RS resource index #2, CSI-RS resource index #6 and SRS resource #3 is on.

For a time instance without applicable dynamic beam on/off indication, the beam status indicated in SIB1 and "ServingCellConfigCommon" will be adopted.

In addition, the first signaling can indicate whether the first spatial domain filter associated with the first set of RS is on or off in various manners. For example, the first signaling may indicate whether the first spatial domain filter associated with the first set of RS is on or off by a bitmap corresponding to each RS of the first set of RS. For example, "1" means on, and "0" means off in the bitmap. For a signaling in pattern, multiple bitmaps will be used to indicate the pattern.

In some other embodiments of the present application, the first signaling may indicate whether the first spatial domain filter associated with the first set of RS is on or off by codepoints. Each codepoint indicates a group containing at least one RS associated with a spatial domain filter being on (i.e., a group only including RS associated with a spatial domain filter being on) or a group containing at least one RS associated with a spatial domain filter being off (i.e., a group only including RS associated with a spatial domain filter being off). For a RS, whether within the group containing at least one RS associated with a spatial domain filter being on, or within the group containing at least one RS associated with a spatial domain filter being off is predefined or configured by a higher layer signaling, e.g., RRC or MAC CE. In other words, the at least one RS within a group can be predefined or configured by higher layer signaling. For example, a group contains at least one of: SSB, CSI-RS and SRS. SSB and/or CSI-RS and/or SRS may be indicated within one group by RRC with a group index, wherein SSB index and/or CSI-RS resource index and/or SRS resource index associated with a spatial domain filter which is considered to be on, are indicated by a group index, and others associated with another spatial domain filter which is considered to be off, are not indicated by the group index or indicated by another group index. . . . Group common DCI can be used to indicate one of the groups. Alternatively, a group can be configured with at least one of: SSB resource, CSI-RS resource, SRS resource by the resource index; and when the group index is indicated by a beam status indication signaling (i.e., the first signaling), the spatial domain filter associated with all RS within the group will be considered to be on. For a signaling in pattern, sequence of group indexes will be used to indicate the pattern.

In some scenarios, the remote side may receive more than one signaling for indicating the same spatial domain filter is on or off, and their applicable time may overlap. That is, for a specific time instance, there may be more than one signaling for indicating the same spatial domain filter is on or off. Thus, UE has to determine which signaling should be applied for the specific time instance. One exemplary solution for that is: the more than one signaling is consistent with each other, e.g., all indicating the spatial domain filter is on or all indicating off. Another exemplary solution for that is: the latest one of the more than one signaling has a higher priority (two signaling) or highest priority (three or more signaling).

Based on the received signaling indicating whether a beam is on or off (i.e., the first signaling), UE has to determine how to perform the data transmission associated with the beam, because the dynamic beam on/off indication mechanism has a great impact on the data transmission associated with the beam, which generally is downlink reception, or uplink transmission, or both of downlink reception and uplink transmission associated with beam. For example, dynamic beam on/off indication may impact PDSCH transmission and feedback of a PDSCH associated with an off beam, and may also impact PDCCH monitoring, repeated PUSCH, repeated PUCCH, and periodic SRS transmission etc. Similar impact also exists in the network side.

In the case that the first signaling indicates that the first spatial domain filter is off, there are various manners that gNB and UE can adopt. For example, in the network side, BS may stop performing the associated data transmission or perform the associated data transmission with a second spatial domain filter different from the first spatial domain filter in step 203. In the remote side, UE may stop performing the associated data transmission or perform the associated data transmission with a second spatial domain filter different from the first spatial domain filter in step 204. In some embodiments of the present application, in the case of stopping performing the associated data transmission with the first spatial domain filter, UE may also deactivate the corresponding data transmission.

The second spatial domain filter can be determined in various manners. For example, in some embodiments of the present application, the second spatial domain filter is determined based on the lowest indexed TCI state of a PUSCH TCI state list excluding the TCI state whose associated spatial domain filter is indicated off. In some other embodiments of the present application, the second spatial domain filter is determined based on the lowest indexed downlink RS in the beam status indication signaling excluding that whose associated spatial domain filter indicated off, or the lowest indexed uplink RS in the beam status indication signaling excluding that whose associated spatial domain filter is indicated off, or the lowest indexed RS in the beam status indication signaling excluding that whose associated spatial domain filter indicated off. In some yet other embodiments of the present application, the second spatial domain filter is determined based on a TCI state of the lowest indexed CORESET excluding a CORESET whose associated QCL-typeD RS belongs to the first set of RS associated with the first spatial domain filter indicated off. In some yet other embodiments of the present application, the second spatial domain filter is determined based on the lowest indexed PUCCH resource in a PUCCH resource set excluding a PUCCH resource whose spatial relation information is associated with a RS belongs to the first set of RS associated with the first spatial domain filter indicated off. In some yet other embodiments of the present application, the second spatial domain filter is determined based on the lowest indexed one of a set of pathloss RSs excluding a path loss RS belongs to the first set of RS associated with the first spatial domain filter indicated off.

In the case that the first signaling indicates the first spatial domain filter is on (supposing the first spatial domain filter is the applicable one even if there are multiple signaling for indicating beam on or off), BS and UE may perform the associated data transmission with the first spatial domain filter if it is configured.

Based on the above basic solutions, more details will be illustrated in some embodiments in view of various application scenarios hereafter.

PDCCH Under Dynamic Beam on/Off Indication Mechanism

In some embodiments of the present application, in the case that at least one RS with QCL-typeD for a CORESET where a search space of a PDCCH is contained belongs to the first set of RS associated with the first spatial domain filter which is indicated off, in the network side, the network apparatus, e.g., gNB may stop transmitting the PDCCH with the first spatial domain filter, and in the remote side, the remote apparatus, e.g., UE may stop monitoring PDCCH with the first spatial domain filter. In the case that at least one RS with QCL-typeD for a CORESET where a search space of the PDCCH is contained belongs to the first set of RS associated with the first spatial domain filter which is indicated on, in the network side, the network apparatus, e.g., gNB may transmit PDCCH with the first spatial domain filter, and in the remote side, the remote apparatus, e.g., UE may monitoring (or restart monitoring) PDCCH with the first spatial domain filter. Various search spaces are applicable for PDCCH reception at UE side, e.g., search space associated with SIB1 reception, search space associated with other system information (OSI) reception, search space associated with paging, search space associated with random access (RA), common search space (CSS) and UE-specific search space (USS).

The PDCCH monitoring parameters, e.g., periodicity, offset, duration can be configured by RRC signaling as in legacy 3GPP release. QCL-typeD of CORESET (or TCI state for CORESET) may be updated or configured by MAC CE. In response to the RS with QCL-typeD of the CORESET is updated by a MAC CE, BS may stop or continue transmitting the PDCCH based on the spatial domain configuration in the MAC CE, and UE may stop or continue monitoring the PDCCH based on the spatial domain configuration in the MAC CE.

In response to the associated first spatial domain filter being set off, gNB can also transmit PDCCH with a second spatial domain filter which is different from the first spatial domain filter. The second spatial domain filter can be predefined in specification or configured by gNB. For example, the second spatial domain filter can be that associated with the lowest or largest indexed DL RS indicated to be on in the beam status indication signaling, or alternatively, the second spatial domain filter can be that associated with the lowest or largest indexed UL RS indicated to be on in the beam status indication signaling, or alternatively, the second spatial domain filter can be that associated with the lowest or largest indexed RS indicated to be on in the beam status indication signaling. The second spatial domain filter can also be that associated with the lowest or largest indexed TCI state in the PDSCH TCI state list excluding that whose associated spatial domain filter is indicated off. In some other embodiments of the present application, the second spatial domain filter can be the lowest or largest indexed PUCCH resource in the PUCCH resource set excluding that whose associated spatial domain filter is indicated off. In some yet other embodiments of the present application, the second spatial domain filter can be that associated the lowest or largest indexed CORESET identity (ID) and the CORESET whose associated spatial domain filter is indicated off is excluded. The second spatial domain filter can also be that associated with the lowest or largest indexed path loss RS in the path loss RS set excluding that whose associated spatial domain filter is indicated off.

PDSCH Under Dynamic Beam on/Off Indication Mechanism

In some embodiments of the present application, SPS PDSCH can be activated by a PDCCH. After the activation, there will be multiple PDSCH transmissions.

The SPS PDSCH may be deactivated by another PDCCH. After the deactivation, the SPS PDSDCH transmission is stopped. The SPS PDSCH may be associated with a spatial domain filter. In the case that at least one RS with QCL-typeD of a TCI state of the PDSCH belongs to the first set of RS associated with the first spatial domain filter which is indicated off, the network apparatus, e.g., gNB may stop transmitting SPS PDSCH with the first spatial domain filter, and the remote apparatus, e.g., UE may stop receiving SPS PDSCH with the first spatial domain filter while the SPS PDSCH is still activated. In some other embodiments of the present application, besides stop receiving SPS PDSCH with the first spatial domain filter, UE may also deactivate the SPS PDSCH.

In some embodiments of the present application, there are multiple PDSCH occasions scheduled by a single PDCCH, and the multiple PDSCH occasions may occupy different time/frequency domain resources and associated with different TCI states.

For example, there are a plurality of PDSCH occasions scheduled by a PDCCH and there are two TCI states in a codepoint of a DCI field, and each PDSCH occasion is associated with a TCI state. The two TCI states can be associated with the same DMRS CDM group. In the case that at least one RS with QCL-typeD in the corresponding TCI state associated with the at least one PDSCH occasion belongs to the first set of RS associated with the first spatial domain filter which is indicated off, gNB may stop transmitting the at least one PDSCH occasion and UE may stop receiving the at least one PDSCH occasion. ACK/NACK for the PDSCH is generated in the UE based on the remaining PDSCH occasions of the plurality of PDSCH occasions that are not stopped.

The two TCI states may be associated with different DMRS CDM groups, wherein each DMRS CDM group is associated with a PDSCH occasion. Each DMRS CDM group is also associated a PDSCH codeword or a PDSCH transmission block. Regarding feedback generation of PDSCH codewords and/or transmission block associated with the stopped PDSCH occasions, NACK is generated in the UE in some embodiments of the present application, while in some other embodiments of the present application, ACK/NACK is generated based on the remaining PDSCH occasions (i.e., those not being stopped).

According to some embodiments of the present application, in the case that the first signaling indicates that the first set of RS is off, the network side may not stop transmitting PDSCH and the remote side may not stop receiving PDSCH.

For example, there are a plurality of PDSCH occasions scheduled by a PDCCH and there are two TCI states in a codepoint of a DCI field. In the case that at least one RS with QCL-typeD in the corresponding TCI state associated with the at least one PDSCH occasion belongs to the first set of RS associated with the first spatial domain filter which is indicated off, gNB may transmit the at least one PDSCH occasion with the second spatial domain filter, and the UE may receive the at least one PDSCH occasion with the second spatial domain filter. The second spatial domain filter can be predefined in specification or configured by higher layer signaling. The second spatial domain filter can be predefined in specification or configured by gNB. For example, the second spatial domain filter can be that associated with the lowest or largest indexed DL RS indicated to be on in the beam status indication signaling, or alternatively, the second spatial domain filter can be that associated with the lowest or largest indexed UL RS indicated to be on in the beam status indication signaling, or alternatively, the second spatial domain filter can be that associated with the lowest or largest indexed RS indicated to be on in the beam status indication signaling. In some other embodiments of the present application, the second spatial domain filter can also be that associated with the lowest or largest indexed TCI state in the PDSCH TCI state list excluding that whose associated spatial domain filter is indicated off. In some yet other embodiments of the present application, the second spatial domain filter can be the lowest or largest indexed PUCCH resource in the PUCCH resource set excluding that whose associated spatial domain filter is indicated off. In some yet other embodiments of the present application, the second spatial domain filter can be that associated the lowest or largest indexed CORESET ID and the CORESET whose associated spatial domain filter is indicated off is excluded. The second spatial domain filter can also be that associated with the lowest or largest indexed path loss RS in the path loss RS set excluding that whose associated spatial domain filter is indicated off.

The PDSCH with two TCI states can be frequency division multiplexed (FDMed), space division multiplexed (SDMed), or time division multiplexed (TDMed). Some embodiments on PDSCH under dynamic beam on/off indication mechanism in the UE side in view of each multiplexing mode will be illustrated as follows.

Figure 3:
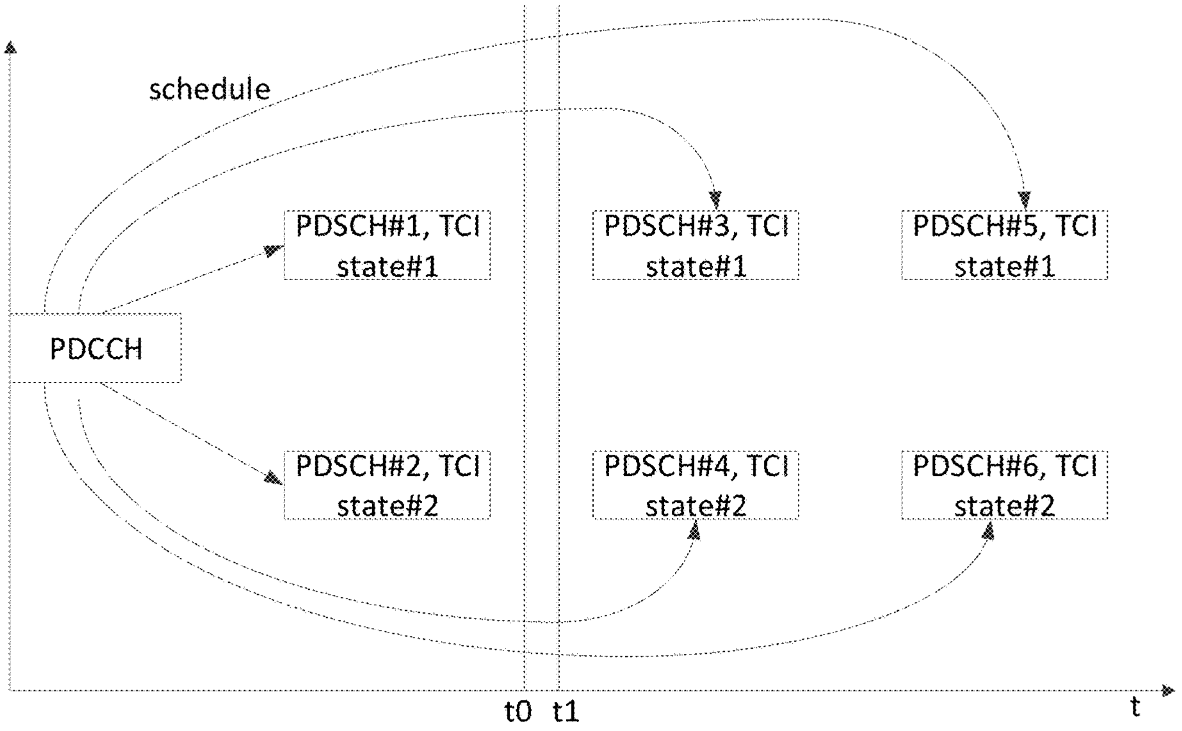
FIG. 3 illustrates a diagram of an exemplary FDMed PDSCH transmission under the dynamic beam on/off indication mechanism according to some embodiments of the present application.

FIG. 3 illustrates a diagram of an exemplary FDMed PDSCH transmission under the dynamic beam on/off indication mechanism according to some embodiments of the present application.

As shown in FIG. 3, the PDSCH transmission is an FDMed PDSCH with repetitions scheduled by a PDCCH. There are a plurality of PDSCH occasions, i.e., PDSCH #1 associated with TCI state #1, PDSCH #2 associated with TCI state #2, PDSCH #3 associated with TCI state #1, PDSCH #4 associated with TCI state #2, PDSCH #5 associated with TCI state #1, and PDSCH #6 associated with TCI state #2. All the PDSCH occasions and both the two TCI states are associated with the same CDM group, e.g., CDM group #0.

At time instance t0, UE receives a beam on/off indication signaling (i.e., the first signaling), indicating that the spatial domain filter associated with TCI state #1 is off while the spatial domain filter associated with TCI state #2 is on. The beam on/off indication signaling will be applicable beginning from time instance t1 according to a predefined rule or a configured delay. Then, after t1, UE will stop receiving PDSCH #3 associated with TCI state #1 and PDSCH #5 associated with TCI state #1 according to the beam on/off indication signaling, and will only receive PDSCH #4 associated with TCI state #2 and PDSCH #6 associated with TCI state #2.

Figure 4:
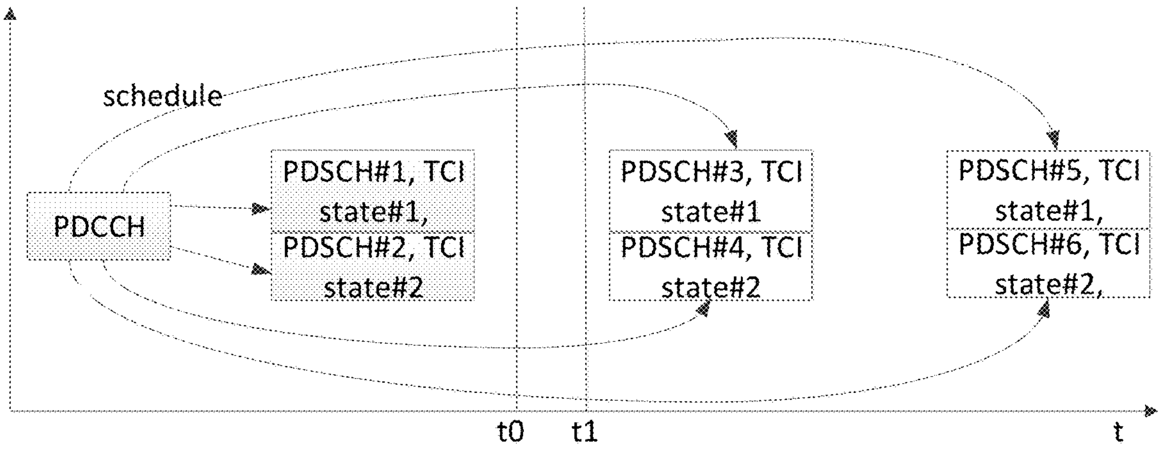
FIG. 4 illustrates a diagram of an exemplary SDMed PDSCH transmission under the dynamic beam on/off indication mechanism according to some embodiments of the present application.

FIG. 4 illustrates a diagram of an exemplary SDMed PDSCH transmission under the dynamic beam on/off indication mechanism according to some embodiments of the present application.

As shown in FIG. 4, the PDSCH transmission is an SDMed PDSCH with repetitions scheduled by a PDCCH. There are a plurality of PDSCH occasions, i.e., PDSCH #1 associated with TCI state #1, PDSCH #2 associated with TCI state #2, PDSCH #3 associated with TCI state #1, PDSCH #4 associated with TCI state #2, PDSCH #5 associated with TCI state #1, and PDSCH #6 associated with TCI state #2. In addition, PDSCH #1 associated with TCI state #1, PDSCH #3 associated with TCI state #1 and PDSCH #5 associated with TCI state #1 are associated with DMRS CDM group #0; and PDSCH #2 associated with TCI state #2, PDSCH #4 associated with TCI state #2, and PDSCH #6 associated with TCI state #2 are associated with DMRS CDM group #1.

At time instance t0, UE receives a beam on/off indication signaling (i.e., the first signaling), indicating that the spatial domain filter associated with TCI state #1 is off while the spatial domain filter associated with TCI state #2 is on. The beam on/off indication signaling will be applicable beginning from time instance t1 according to a predefined rule or a configured delay. Then, after t1, UE will stop receiving PDSCH #3 associated with TCI state #1 and PDSCH #5 associated with TCI state #1 according to the beam on/off indication signaling, and will only receive PDSCH #4 associated with TCI state #2 and PDSCH #6 associated with TCI state #2. A DMRS CDM group is associated with a codeword or a transmission block (TB). So PDSCH #1, PDSCH #3, PDSCH #5 may be associated with codeword #0 (or TB #0), and PDSCH #2, PDSCH #4, PDSCH #6 may be associated with codeword #1 (or TB #1). For ACK/NACK generation for codeword #0 (or TB #0), since PDSCH #3 and PDSCH #5 are stopped, the ACK/NACK generation for codeword #0 (or TB #0) is based on PDSCH #1, or only NACK is generated for codeword #0 (TB #0). For ACK/NACK generation for codeword #1 (or TB #1), since PDSCH #2, PDSCH #4 and PDSCH #6 can be transmitted by gNB, so ACK/NACK generation can be kept the same as that in legacy release.

Both FIGS. 5*a* and 5*b* illustrate a diagram of an exemplary TDMed PDSCH transmission under the dynamic beam on/off indication mechanism according to some embodiments of the present application, while the repetition mapping patterns of the PDSCH transmission in FIGS. 5*a* and 5B are different.

As shown in FIG. 5*a*, the repetition mapping pattern of the PDSCH transmission is cyclic mapping, that is, the repetitions and TCI states are cyclically mapped. Specifically, there are a plurality of PDSCH occasions, i.e., PDSCH #1 associated with TCI state #1, PDSCH #2 associated with TCI state #2, PDSCH #3 associated with TCI state #1, PDSCH #4 associated with TCI state #2, PDSCH #5 associated with TCI state #1, and PDSCH #6 associated with TCI state #2.

At time instance t0, UE receives a beam on/off indication signaling (i.e., the first signaling), indicating that the spatial domain filter associated with TCI state #1 is off while the spatial domain filter associated with TCI state #2 is on. The beam on/off indication signaling will be applicable beginning from time instance t1 according to a predefined rule or a configured delay. Then, after t1, UE will stop receiving PDSCH #3 associated with TCI state #1 and PDSCH #5 associated with TCI state #1 according to the beam on/off indication signaling, and will only receive PDSCH #4 associated with TCI state #2 and PDSCH #6 associated with TCI state #2.

As shown in FIG. 5*b*, the repetition mapping pattern of the PDSCH transmission is sequential mapping, that is, the repetitions and TCI states are sequentially mapped. Specifically, there are a plurality of PDSCH occasions, i.e., PDSCH #1 associated with TCI state #1, PDSCH #2 associated with TCI state #1, PDSCH #3 associated with TCI state #2, PDSCH #4 associated with TCI state #2, PDSCH #5 associated with TCI state #1, and PDSCH #6 associated with TCI state #1.

At time instance t0, UE receives a beam on/off indication signaling (i.e., the first signaling), indicating that the spatial domain filter associated with TCI state #1 is off while the spatial domain filter associated with TCI state #2 is on. The beam on/off indication signaling will be applicable beginning from time instance t1 according to a predefined rule or a configured delay. Then, after t1, UE will stop receiving PDSCH #2 associated with TCI state #1, PDSCH #5 associated with TCI state #1 and PDSCH #6 associated with TCI state #1 according to the beam on/off indication signaling, and will only receive PDSCH #3 associated with TCI state #2 and PDSCH #4 associated with TCI state #2.

PUSCH Under Dynamic Beam on/Off Indication Mechanism

For codebook based PUSCH, a single SRS indicated by SRI can be used to determine the spatial domain filter of PUSCH. In some embodiments of the present application, in the case that an SRS indicated by an SRI of scheduling DCI or RRC configuration belongs to the first set of RS associated with the first spatial domain filter which is indicated off, UE stops transmitting a codebook based PUSCH, and gNB stops receiving a codebook based PUSCH. In some other embodiments of the present application, UE does not stop transmitting the codebook based PUSCH while transmits the codebook based PUSCH with the second spatial domain filter, and accordingly, gNB receives the codebook based PUSCH with the second spatial domain filter. The second spatial domain filter can be predefined in specification or configured by gNB. For example, the second spatial domain filter can be that associated with the lowest or largest indexed DL RS indicated to be on in the beam status indication signaling, or alternatively, the second spatial domain filter can be that associated with the lowest or largest indexed UL RS indicated to be on in the beam status indication signaling, or alternatively, the second spatial domain filter can be that associated with the lowest or largest indexed RS indicated to be on in the beam status indication signaling. In some other embodiments of the present application, the second spatial domain filter can also be that associated with the lowest or largest indexed TCI state in the PDSCH TCI state list excluding that whose associated spatial domain filter is indicated off. In some yet other embodiments of the present application, the second spatial domain filter can be the lowest or largest indexed PUCCH resource in the PUCCH resource set excluding that whose associated spatial domain filter is indicated off. In some yet other embodiments of the present application, the second spatial domain filter can be that associated the lowest or largest indexed CORESET ID and the CORESET whose associated spatial domain filter is indicated off is excluded. In some yet other embodiments of the present application, the second spatial domain filter can be that associated with the lowest or largest indexed path loss RS in the path loss RS set excluding that whose associated spatial domain filter is indicated off.

For non-codebook based PUSCH, multiple single port SRS resources will be indicated by SRI, and thus a single PUSCH can be associated with multiple spatial domain filters, with each SRS resource for a spatial domain filter. A SRS resource is associated with a DMRS port, a DMRS port is associated with a spatial transmission layer, and one or multiple transmission layers are mapped to a codeword or a transmission block. For example, SRS resource #1, #3, #5 are indicated by SRI, and then they are corresponding to DMRS port #0, #1, #2, respectively, and corresponding to Layer #0, #1, #2, respectively. Layer #0, #1, #2 are mapped to codeword #0 (or TB #0), and accordingly SRS resource #1, #3, #5 are associated with codeword #0 (or TB #0). In some embodiments of the present application, in the case that a spatial domain transmission layer of a codeword (or TB) of a non-codebook based PUSCH is associated with an SRS resource indicated by an SRI in the scheduling DCI or RRC configuration, and the at least one SRS belongs to or QCLed with (with respect to typeD) the first set of RS associated with the first spatial domain filter which is indicated off, UE stops transmitting the codeword (or TB), and gNB stops receiving the codeword (or TB). In some other embodiments of the present application, UE does not stop transmitting the codeword (or TB) while transmits the codeword with the second spatial domain filter. The second spatial domain filter can be predefined in specification or configured by gNB. For example, the second spatial domain filter can be that associated with the lowest or largest indexed DL RS indicated to be on in the beam status indication signaling, or alternatively, the second spatial domain filter can be that associated with the lowest or largest indexed UL RS indicated to be on in the beam status indication signaling, or alternatively, the second spatial domain filter can be that associated with the lowest or largest indexed RS indicated to be on in the beam status indication signaling. In some other embodiments of the present application, the second spatial domain filter can also be that associated with the lowest or largest indexed TCI state in the PDSCH TCI state list excluding that whose associated spatial domain filter is indicated off. In some yet other embodiments of the present application, the second spatial domain filter can be the lowest or largest indexed PUCCH resource in the PUCCH resource set excluding that whose associated spatial domain filter is indicated off. In some yet other embodiments of the present application, the second spatial domain filter can be that associated the lowest or largest indexed CORESET ID and the CORESET whose associated spatial domain filter is indicated off is excluded. In some yet other embodiments of the present application, the second spatial domain filter can be that associated with the lowest or largest indexed path loss RS in the path loss RS set excluding that whose associated spatial domain filter is indicated off.

FIG. 6 illustrates a diagram of an exemplary PUSCH transmission under the dynamic beam on/off indication mechanism according to some embodiments of the present application.

As shown in FIG. 6, UE may receive a RRC for PUSCH transmission. According to the RRC, a first PUSCH transmission is a codebook based PUSCH and a second PUSCH transmission is a non-codebook based PUSCH. For the first PUSCH transmission, there is single SRS resource #2 with up to 8 ports indicated in DCI or RRC. For the second PUSCH transmission, there are up to 4 SRS resources with single port, e.g., SRS resource #1, #3, #5 indicated in DCI or RRC. SRS resource #1, #3, #5 correspond to Layer #0, #1, #2, respectively. Layer #0 is mapped to codeword #0, and accordingly SRS resource #1, #3, #5 are also associated with codeword #0. Both the first PUSCH transmission and the second PUSCH transmission are repeated in time domain, and may be Grant free typ1, Grant free typ2, PUSCH repetition type A or PUSCH repetition type B. There may also be codeword to transmission block mapping. Two codewords (e.g., codeword #0 and codeword #1) can be mapped to two transmission blocks (TB) s (e.g., TB #0 and TB #1). The mapping can be codeword #0 to TB #0 and codeword #1 to TB #1. Alternatively, the mapping can also be codeword #0 to TB #1 and codeword #1 to TB #0.

Specifically, the first PUSCH transmission includes a plurality of PUSCH occasions, i.e., PUSCH #1-0, PUSCH #1-1, PUSCH #1-2, PUSCH #1-3, PUSCH #1-4, and PUSCH #1-5. The second PUSCH transmission includes a plurality of PUSCH occasions, i.e., PUSCH #2-0, PUSCH #2-1, PUSCH #2-2, PUSCH #2-3, PUSCH #2-4, and PUSCH #2-5. At time instance t0, UE receives a beam on/off indication signaling (i.e., the first signaling), indicating that the spatial domain filter associated with SRS resource #1, #2 is off while the spatial domain filter associated with SRS resource #3, #5 is on. The beam on/off indication signaling will be applicable beginning from time instance t1 according to a predefined rule or a configured delay. Then, after t1, for the first PUSCH transmission, UE will stop transmitting PUSCH #1-2, PUSCH #1-3, PUSCH #1-4, and PUSCH #1-5 according to the beam on/off indication signaling or transmit PUSCH #1-2, PUSCH #1-3, PUSCH #1-4, and PUSCH #1-5 with a second spatial domain filter different from the first spatial domain filter. For the second PUSCH transmission, after t1, Layer #0 cannot be transmitted by UE or be changed to the second spatial domain filter due to the associated spatial domain filter being indicated off, and Layer #1 and Layer #2 cannot be transmitted by UE or be changed to the second spatial domain filter either due to having the same codeword (or TB) with Layer #0.

When PUSCH is scheduled by DCI 0-0, for different cases, the beam is determined by beam of the lowest indexed PUCCH resource, or beam of the lowest CORESET ID in legacy release. However, in some embodiments of the present application, in the case that a RS associated with a spatial domain filter of a PUSCH scheduled by DCI 0-0 belongs to the first set of RS associated with the first spatial domain filter which is indicated off, UE stops transmitting the PUSCH, and gNB stops receiving the PUSCH. In some other embodiments of the present application, UE does not stop transmitting the PUSCH while transmits the PUSCH with the second spatial domain filter, and accordingly, gNB receives the PUSCH with the second spatial domain filter. The second spatial domain filter can be predefined in specification or configured by gNB. For example, the second spatial domain filter can be that associated with the lowest or largest indexed DL RS indicated to be on in the beam status indication signaling, or alternatively, the second spatial domain filter can be that associated with the lowest or largest indexed UL RS indicated to be on in the beam status indication signaling, or alternatively, the second spatial domain filter can be that associated with the lowest or largest indexed RS indicated to be on in the beam status indication signaling. In some other embodiments of the present application, the second spatial domain filter can also be that associated with the lowest or largest indexed TCI state in the PDSCH TCI state list excluding that whose associated spatial domain filter is indicated off. In some yet other embodiments of the present application, the second spatial domain filter can be the lowest or largest indexed PUCCH resource in the PUCCH resource set excluding that whose associated spatial domain filter is indicated off. In some yet other embodiments of the present application, the second spatial domain filter can be that associated the lowest or largest indexed CORESET ID and the CORESET whose associated spatial domain filter is indicated off is excluded. In some other embodiments of the present application, the second spatial domain filter can be that associated with the lowest or largest indexed path loss RS in the path loss RS set excluding that whose associated spatial domain filter is indicated off.

PUCCH Under Dynamic Beam on/Off Indication Mechanism

In some embodiments of the present application, in the case that a RS associated with a spatial domain filter of a PUCCH resource belongs to the first set of RS associated with the first spatial domain filter which is indicated off, UE stops transmitting the PUCCH, and gNB stops receiving the PUCCH. In some other embodiments of the present application, UE does not stop transmitting the PUCCH, while transmits the PUCCH with the second spatial domain filter, and accordingly, gNB monitors the PUCCH with the second spatial domain filter. The second spatial domain filter can be predefined in specification or configured by gNB. For example, the second spatial domain filter can be that associated with the lowest or largest indexed DL RS indicated to be on in the beam status indication signaling, or alternatively, the second spatial domain filter can be that associated with the lowest or largest indexed UL RS indicated to be on in the beam status indication signaling, or alternatively, the second spatial domain filter can be that associated with the lowest or largest indexed RS indicated to be on in the beam status indication signaling. In some other embodiments of the present application, the second spatial domain filter can also be that associated with the lowest or largest indexed TCI state in the PDSCH TCI state list excluding that whose associated spatial domain filter is indicated off. In some yet other embodiments of the present application, the second spatial domain filter can be the lowest or largest indexed PUCCH resource in the PUCCH resource set excluding that whose associated spatial domain filter is indicated off. In some yet other embodiments of the present application, the second spatial domain filter can be that associated the lowest or largest indexed CORESET ID and the CORESET whose associated spatial domain filter is indicated off is excluded. In some other embodiments of the present application, the second spatial domain filter can be that associated with the lowest or largest indexed path loss RS in the path loss RS set excluding that whose associated spatial domain filter is indicated off.

In some embodiments of the present application, there is time domain overlap between repeated PUCCH and SSB. A legacy method is to give SSB configured in SIB1 or ServingCellconfigCommon higher priority. However, under the dynamic beam on/off indication mechanism, when determining whether a PUCCH transmission can be performed or not by UE, it should be determined based on the indicated SSB whose associated spatial domain filter is indicated on by the first signaling, which has higher priority than that in SIB1 and Serving CellConfigCommon. Accordingly, whether UE transmits a PUCCH or not is based on an SSB associated with the first spatial domain filter indicated on by the first signaling.

wSRS Under Dynamic Beam on/Off Indication Mechanism

In some embodiments of the present application, UE stops transmitting an SRS resource in the case that a RS associated with spatial relation information of the SRS resource belongs to the first set of RS whose associated spatial domain filter is indicated off. Accordingly, gNB stops monitoring the SRS resource. MAC CE signaling may be received in the UE to update the spatial relation information of SRS, and whether to transmit the SRS or not is based on the latest spatial relation information updated by the MAC CE. In response to spatial relation information of the SRS being updated by a MAC CE, UE starts to determine whether SRS transmission can be performed or not. If the spatial domain filter associated with SRS updated by MAC CE is indicated on based on the first signaling, SRS transmission will be performed by the UE. Otherwise, if the spatial domain filter associated with SRS updated by MAC CE is indicated off based on the first signaling, SRS transmission will NOT be performed by the UE. In some other embodiments of the present application, UE will transmit the SRS with the second spatial domain filter if the spatial domain filter associated with SRS updated by MAC CE is indicated off based on the first signaling. And accordingly, gNB receives the SRS with the second spatial domain filter. The second spatial domain filter can be predefined in specification or configured by gNB. For example, the second spatial domain filter can be that associated with the lowest or largest indexed DL RS indicated to be on in the beam status indication signaling, or alternatively, the second spatial domain filter can be that associated with the lowest or largest indexed UL RS indicated to be on in the beam status indication signaling, or alternatively, the second spatial domain filter can be that associated with the lowest or largest indexed RS indicated to be on in the beam status indication signaling. In some other embodiments of the present application, the second spatial domain filter can also be that associated with the lowest or largest indexed TCI state in the PDSCH TCI state list excluding that whose associated spatial domain filter is indicated off. In some other embodiments of the present application, the second spatial domain filter can be the lowest or largest indexed PUCCH resource in the PUCCH resource set excluding that whose associated spatial domain filter is indicated off. In some other embodiments of the present application, the second spatial domain filter can be that associated the lowest or largest indexed CORESET ID and the CORESET whose associated spatial domain filter is indicated off is excluded. In some other embodiments of the present application, the second spatial domain filter can be that associated with the lowest or largest indexed path loss RS in the path loss RS set excluding that whose associated spatial domain filter is indicated off.

Besides the methods, embodiments of the present application also propose an apparatus for data transmission during wireless communication.

For example, FIG. 7 illustrates a block diagram of an apparatus for data transmission 700 according to some embodiments of the present application.

As shown in FIG. 7, the apparatus 700 may include at least one non-transitory computer-readable medium 701, at least one receiving circuitry 702, at least one transmitting circuitry 704, and at least one processor 706 coupled to the non-transitory computer-readable medium 701, the receiving circuitry 702 and the transmitting circuitry 704. The at least one processor 706 may be a CPU, a DSP, a microprocessor etc. The apparatus 700 may be a network apparatus, e.g., a gNB or a remote apparatus, e.g., UE configured to perform a method illustrated in the above or the like.

Although in this figure, elements such as the at least one processor 706, transmitting circuitry 704, and receiving circuitry 702 are described in the singular, the plural is contemplated unless a limitation to the singular is explicitly stated. In some embodiments of the present application, the receiving circuitry 702 and the transmitting circuitry 704 can be combined into a single device, such as a transceiver. In certain embodiments of the present application, the apparatus 700 may further include an input device, a memory, and/or other components.

In some embodiments of the present application, the non-transitory computer-readable medium 701 may have stored thereon computer-executable instructions to cause a processor to implement the method with respect to the network apparatus as described above. For example, the computer-executable instructions, when executed, cause the processor 706 interacting with receiving circuitry 702 and transmitting circuitry 704, so as to perform the steps with respect to the network apparatus as depicted above.

In some embodiments of the present application, the non-transitory computer-readable medium 701 may have stored thereon computer-executable instructions to cause a processor to implement the method with respect to the UE as described above. For example, the computer-executable instructions, when executed, cause the processor 706 interacting with receiving circuitry 702 and transmitting circuitry 704, so as to perform the steps with respect to the UE as illustrated above.

FIG. 8 is a block diagram of an apparatus for data transmission during wireless communication according to some other embodiments of the present application.

Referring to FIG. 8, the apparatus 800, for example a gNB or a UE may include at least one processor 802 and at least one transceiver 804 coupled to the at least one processor 802. The transceiver 804 may include at least one separate receiving circuitry 806 and transmitting circuitry 808, or at least one integrated receiving circuitry 806 and transmitting circuitry 808. The at least one processor 802 may be a CPU, a DSP, a microprocessor etc.

According to some embodiments of the present application, when the apparatus 800 is a remote apparatus, the processor is configured to: receive a first signaling indicating whether a first spatial domain filter associated with a first set of RS is on or off, wherein the first set of RS is associated with at least one of: downlink reception or uplink transmission in the remote apparatus; and in the case that the first signaling indicates that the first spatial domain is off, stop performing the associated at least one of: downlink reception or uplink transmission, or perform the associated at least one of: downlink reception or uplink transmission associated with a second spatial domain filter different from the first spatial domain filter.

According to some other embodiments of the present application, when the apparatus 800 is a network apparatus, the processor may be configured to: transmit a first signaling indicating whether a first spatial domain filter associated with a first set of RS is on or off, wherein the first set of RS is associated with at least one of: downlink transmission or uplink reception in the network apparatus; and in the case that the first signaling indicates that the first spatial domain filter is off, stop performing the associated at least one of: downlink transmission or uplink reception, or perform the associated at least one of: downlink transmission or uplink reception with a second spatial domain filter different from the first spatial domain filter.

The method according to embodiments of the present application can also be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this application. For example, an embodiment of the present application provides an apparatus, including a processor and a memory. Computer programmable instructions for implementing a method are stored in the memory, and the processor is configured to perform the computer programmable instructions to implement the method. The method may be a method as stated above or other method according to an embodiment of the present application.

An alternative embodiment preferably implements the methods according to embodiments of the present application in a non-transitory, computer-readable storage medium storing computer programmable instructions. The instructions are preferably executed by computer-executable components preferably integrated with a network security system. The non-transitory, computer-readable storage medium may be stored on any suitable computer readable media such as RAMs, ROMs, flash memory, EEPROMs, optical storage devices (CD or DVD), hard drives, floppy drives, or any suitable device. The computer-executable component is preferably a processor but the instructions may alternatively or additionally be executed by any suitable dedicated hardware device. For example, an embodiment of the present application provides a non-transitory, computer-readable storage medium having computer programmable instructions stored therein. The computer programmable instructions are configured to implement a method as stated above or other method according to an embodiment of the present application.

In addition, in this disclosure, the terms "includes," "including," or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that includes the element. Also, the term "another" is defined as at least a second or more. The terms "having," and the like, as used herein, are defined as "including."

What is claimed:

1. A remote apparatus for wireless communication, comprising:

at least one memory; and at least one processor coupled with the at least one memory and configured to cause the remote apparatus to:

receive a first signaling indicating whether a first spatial domain filter associated with a first set of reference signals (RSs) is on or off, wherein the first set of RSs is associated with downlink reception or uplink transmission in the remote apparatus; and when the first signaling indicates that the first spatial domain filter is off, stop performing the downlink reception or uplink transmission, or perform the downlink reception or uplink transmission associated with a second spatial domain filter that is different from the first spatial domain filter, wherein the first signaling is associated with a time domain duration beginning from a time instance, wherein the time instance is determined based on a configured or predefined time domain delay between a time at which the first signaling is received and a time at which the first spatial domain filter is off.

2. The remote apparatus according to claim 1, wherein, for a time instance, at least one other signaling other than the first signaling indicates the first spatial domain filter is on or off, wherein the at least one other signaling is consistent with the first signaling or a latest one of the first signaling and the at least one other signaling has a higher priority.

3. The remote apparatus according to claim 1, wherein, when the first signaling indicates that the first spatial domain filter is off, not performing the downlink reception or uplink transmission by:

stopping monitoring physical downlink control channel (PDCCH) when at least one RS with quasi co-location (QCL)-typeD for a control resource set (CORESET), where a search space of the PDCCH belongs to the first set of RSs, or when the RS with QCL-typeD of the CORESET is updated by a media access control (MAC) control element (CE), stopping or continue monitoring the PDCCH based on the spatial domain configuration in the MAC CE.

4. The remote apparatus according to claim 1, wherein, when the first signaling indicates that the first spatial domain filter is off, not performing the downlink reception or uplink transmission by:

stopping receiving semi-persistent scheduling (SPS) physical downlink shared channel (PDSCH) and deactivating or not deactivating the SPS PDSCH when at least one RS with quasi co-location (QCL)-typeD of a transmission configuration indication (TCI) state of the PDSCH belongs to the first set of RSs.

5. The remote apparatus according to claim 1, wherein, when the first signaling indicates that the first spatial domain filter is off, not performing the downlink reception or uplink transmission by:

when there are a plurality of physical downlink shared channel (PDSCH) occasions scheduled by a physical downlink control channel (PDCCH) and two transmission configuration indication (TCI) states in a codepoint of a downlink control information (DCI) field, and each PDSCH occasion is associated with a TCI state, stopping receiving at least one PDSCH occasion of the plurality of PDSCH occasions, wherein the at least one RS with quasi co-location (QCL)-typeD in a corresponding TCI state associated with the at least one PDSCH occasion belongs to the first set of RSs, or when the two TCI states are associated with different demodulation reference signal (DMRS) code division multiplexing (CDM) groups, each DMRS CDM group is associated with a PDSCH codeword and a PDSCH occasion; and for feedback generation of PDSCH codewords associated with stopped PDSCH occasions, negative acknowledge (ACK) (NACK) is generated or ACK/NACK is generated based on the remaining PDSCH occasions.

6. The remote apparatus according to claim 1, wherein, when the first signaling indicates that the first set of RSs is off, performing the downlink reception or uplink transmission with the second spatial domain filter by:

when there are a plurality of physical downlink shared channel (PDSCH) occasions scheduled by a physical downlink control channel (PDCCH) and two transmission configuration indication (TCI) states in a codepoint of a downlink control information (DCI) field, receiving at least one PDSCH occasion of the plurality of PDSCH occasions with the second spatial domain filter, wherein at least one RS with quasi co-location (QCL)-typeD in the corresponding TCI state associated with the at least one PDSCH occasion belongs to the first set of RSs.

7. The remote apparatus according to claim 1, wherein, when the first signaling indicates that the first spatial domain filter is off, not performing the downlink reception or uplink transmission or performing the downlink reception or uplink transmission with the second spatial domain filter by:

when a sounding reference signal (SRS) indicated by a signal resource indicator (SRI) of a scheduling downlink control information (DCI) or radio resource control (RRC) configuration belongs to the first set of RSs, stopping transmitting a codebook based physical uplink shared channel (PUSCH), or transmitting the codebook based PUSCH with the second spatial domain filter.

8. The remote apparatus according to claim 1, wherein, when the first signaling indicates that the first spatial domain filter is off, not performing the downlink reception or uplink transmission or performing the downlink reception or uplink transmission with the second spatial domain by:

when a spatial domain transmission layer of a codeword of a non-codebook based physical uplink shared channel (PUSCH) is associated with a sounding reference signal (SRS) resource indicated by a signal resource indicator (SRI) in the scheduling downlink control information (DCI) or radio resource control (RRC) configuration, and the at least one SRS belongs to the first set of RS, stopping transmitting the codeword, or transmitting the codeword with the second spatial domain filter.

9. The remote apparatus according to claim 1, wherein, when the first signaling indicates that the first spatial domain filter is off, not performing the downlink reception or uplink transmission or performing the downlink reception or uplink transmission with the second spatial domain filter further comprises:

when an RS associated with a spatial domain filter of a physical uplink shared channel (PUSCH) scheduled by downlink control information (DCI) 0-0 belongs to the first set of RSs, stopping transmitting the PUSCH, or transmitting the PUSCH with the second spatial domain filter.

10. The remote apparatus according to claim 1, wherein, when the first signaling indicates that the first spatial domain filter is off, not performing the downlink reception or uplink transmission or performing the downlink reception or uplink transmission with the second spatial domain filter by:

when an RS associated with a spatial domain filter of a physical uplink control channel (PUCCH) belongs to the first set of RSs, stopping transmitting the physical uplink control channel (PUCCH), or transmitting the PUCCH with the second spatial domain filter.

11. The remote apparatus according to claim 1, wherein:

the second spatial domain filter is determined based on a lowest indexed transmission configuration indication (TCI) state of a physical uplink shared channel (PUSCH) TCI state list excluding the TCI state whose associated spatial domain filter is indicated off; or the second spatial domain filter is determined based on a lowest indexed downlink RS, excluding a downlink RS with an associated spatial domain filter indicated off, or a lowest indexed uplink RS, excluding an uplink RS with an associated spatial domain filter indicated off, or a lowest indexed RS, excluding an RS with an associated spatial domain filter is indicated off; or the second spatial domain filter is determined based on a transmission configuration indication (TCI) state of a lowest indexed control resource set (CORESET), excluding a CORESET associated with a quasi co-location (QCL)-typeD RS that belongs to the first set of RSs associated with the first spatial domain filter indicated off; or the second spatial domain filter is determined based on a lowest indexed physical uplink control channel (PUCCH) resource in a PUCCH resource set, excluding a PUCCH resource having spatial relation information that is associated with an RS belonging to the first set of RSs associated with the first spatial domain filter indicated off; or the second spatial domain filter is determined based on a lowest indexed one of a set of pathloss RSs, excluding a path loss RS that belongs to the first set of RSs associated with the first spatial domain filter indicated off.

12. The remote apparatus according to claim 1, wherein, when the first signaling indicates that the first spatial domain filter is off, not performing the downlink reception or uplink transmission by:

stopping transmitting a sounding reference signal (SRS) resource when an RS associated with spatial relation information of the SRS resource belongs to the first set of RSs whose associated spatial domain filter is indicated off.

13. The remote apparatus according to claim 1, wherein the at least one processor is configured to cause the remote apparatus to:

transmit a physical uplink control channel (PUCCH) or not transmit the PUCCH based on a synchronization signal block (SSB) associated with the first spatial domain filter indicated by the first signaling.

14. A method for wireless communication, comprising:

receiving a first signaling indicating whether a first spatial domain filter associated with a first set of reference signals (RSs) is on or off, wherein the first set of RSs is associated with downlink reception or uplink transmission; and when the first signaling indicates the first spatial domain filer being off, stopping performing the downlink reception or uplink transmission, or performing the downlink reception or uplink transmission with a second spatial domain filter different from the first domain filter, wherein the first signaling is associated with a time domain duration beginning from a time instance, wherein the time instance is determined based on a configured or predefined time domain delay between a time at which the first signaling is received and a time at which the first spatial domain filter is off.

15. The remote apparatus according to claim 1, wherein the time domain duration is configured by a radio resource control (RRC) or a media access control (MAC) control element (CE).

16. The remote apparatus according to claim 1, wherein the time domain duration is divided into a plurality of sub-durations, where different sub-durations are associated with different RSs whose associated spatial domain filters are set on or set off.

17. A processor for wireless communication, comprising:

at least one controller coupled with at least one memory and configured to cause the processor to:

receive a first signaling indicating whether a first spatial domain filter associated with a first set of reference signals (RSs) is on or off, wherein the first set of RSs is associated with downlink reception or uplink transmission in the processor; and when the first signaling indicates that the first spatial domain filter is off, stop performing the downlink reception or uplink transmission, or perform the downlink reception or uplink transmission associated with a second spatial domain filter that is different from the first spatial domain filter, wherein the first signaling is associated with a time domain duration beginning from a time instance, wherein the time instance is determined based on a configured or predefined time domain delay between a time at which the first signaling is received and a time at which the first spatial domain filter is off.

18. The processor of claim 17, wherein, for a time instance, at least one other signaling other than the first signaling indicates the first spatial domain filter is on or off, wherein the at least one other signaling is consistent with the first signaling or a latest one of the first signaling and the at least one other signaling has a higher priority.

* * * * *